US009069983B1

United States Patent
Nijjar

(10) Patent No.: US 9,069,983 B1
(45) Date of Patent: Jun. 30, 2015

(54) METHOD AND APPARATUS FOR PROTECTING SENSITIVE INFORMATION FROM DISCLOSURE THROUGH VIRTUAL MACHINES FILES

(75) Inventor: Manjinder Singh Nijjar, Pune (IN)

(73) Assignee: Symantec Corporation, Mountain View, CA (US)

( * ) Notice: Subject to any disclaimer, the term of this patent is extended or adjusted under 35 U.S.C. 154(b) by 1193 days.

(21) Appl. No.: 12/432,652

(22) Filed: Apr. 29, 2009

(51) Int. Cl.
G06F 21/62 (2013.01)
G06F 21/60 (2013.01)
G06F 21/53 (2013.01)
G06F 9/455 (2006.01)
G06F 21/57 (2013.01)

(52) U.S. Cl.
CPC ............ G06F 21/6218 (2013.01); G06F 21/60 (2013.01); G06F 21/53 (2013.01); G06F 9/45533 (2013.01); G06F 21/577 (2013.01); G06F 21/6209 (2013.01); G06F 2221/2143 (2013.01)

(58) Field of Classification Search
CPC ... G06F 21/53; G06F 21/577; G06F 21/6209; G06F 21/60; G06F 21/6245; G06F 21/6218; G06F 2221/2143; G06F 9/45533
See application file for complete search history.

(56) References Cited

U.S. PATENT DOCUMENTS

| 7,802,302 | B1 * | 9/2010 | Nagarkar et al. | 726/24 |
| 7,885,944 | B1 * | 2/2011 | Bruening | 707/694 |
| 7,996,373 | B1 * | 8/2011 | Zoppas et al. | 707/694 |
| 8,352,939 | B1 * | 1/2013 | Edwards et al. | 718/1 |
| 2006/0136720 | A1 * | 6/2006 | Armstrong et al. | 713/164 |
| 2007/0027880 | A1 * | 2/2007 | Dettinger et al. | 707/100 |
| 2008/0028435 | A1 * | 1/2008 | Strickland et al. | 726/1 |
| 2008/0077604 | A1 * | 3/2008 | Bharara | 707/101 |
| 2008/0109804 | A1 * | 5/2008 | Bloomstein et al. | 718/1 |
| 2008/0155208 | A1 * | 6/2008 | Hiltgen et al. | 711/154 |
| 2008/0216174 | A1 * | 9/2008 | Vogel et al. | 726/22 |
| 2008/0263658 | A1 * | 10/2008 | Michael et al. | 726/22 |
| 2009/0282266 | A1 * | 11/2009 | Fries et al. | 713/193 |

OTHER PUBLICATIONS

Ironport Systems, "Data Loss Prevention Best Practices," Message Media Publication, Wayback Machine: Feb. 6, 2009, Accessed Nov. 28, 2011, Retrieved [http://web.archive.org/web/20090206024733/http://www.ironport.com/pdf/ironport_dlp_booklet.pdf].*
P. Kanagasingham, "Data Loss Prevention," SANS Institute: InfoSec Reading Room, Aug. 15, 2008, Accessed Nov. 28, 2011, Retrieved [http://www.sans.org/reading_room/whitepapers/dlp/data-loss-prevention_32883].*

(Continued)

Primary Examiner — Jung Kim
Assistant Examiner — Robert Leung
(74) Attorney, Agent, or Firm — Wilmer Cutler Pickering Hale and Dorr LLP

(57) ABSTRACT

A method and apparatus for protecting sensitive information from disclosure through virtual machine files is disclosed. In one embodiment, the method includes processing virtual machine files using at least one processor to access data objects in memory that are associated with at least one virtual machine, examining the data objects using the at least one processor in accordance with a data loss prevention policy in the memory to identify, using the at least one processor, sensitive information within at least one data object of the data objects and securing, using the at least one processor, the sensitive information within the virtual machine files in the memory.

14 Claims, 6 Drawing Sheets

(56) References Cited

OTHER PUBLICATIONS

Heron, G. L., "Secure Virtualization," CERIAS Security Seminar, Purdue University—McAfee, Oct. 24, 2007, Accessed Nov. 28, 2011, Retrieved [http://www.cerias.purdue.edu/assets/pdf/secsem/secsem_20071024.pdf], p. 7.*

Vontu, "7 Requirements of Data Loss Prevention", Vontu, Inc. 2007, 8 pages, Online: http://eval.symantec.com/mktginfo/enterprise/other_resources/7_requirements_of_dlp.pdf.*

VMware, "WMware Disk Mount User's Guide", VMware Inc. 2008, 12 pages.*

McAfee, "McAfee VirusScan Enterprise for Offline Virtual Images," Data Sheet, Jun. 2008, Retrieved: Oct. 18, 2012, Online: http://www.mcafee.com/us/resources/data-sheets/ds-virusscan-enterprise-for-offline-virtual-images.pdf.*

Tech Target, "Should full disk encryption by used to prevent data loss?" Published Feb. 20, 2007, Accessed Apr. 16, 2013, Online: [http://searchsecurity.techtarget.com/answer/Should-full-disk-encryption-be-used-to-prevent-data-loss].*

\* cited by examiner

METHOD AND APPARATUS FOR PROTECTING SENSITIVE INFORMATION FROM DISCLOSURE THROUGH VIRTUAL MACHINES FILES

BACKGROUND OF THE INVENTION

1. Field of the Invention

Embodiments of the present invention generally relate to computer systems and more particularly to a method and apparatus for protecting sensitive information from disclosure through virtual machine files.

2. Description of the Related Art

Conventional computing environments may utilize a number of technologies to process, produce and secure mission critical data for various organizations (e.g., hospitals, government agencies, private companies and/or the like). The mission critical data includes information characterized by various degrees of sensitivity, such as intellectual property, customer data, medical histories, financial records, purchase orders, legal documents, privileged and/or confidential information, medical records, social security numbers, addresses, pictures, documents, contacts, and/or the like. For example, a legal brief that contains a victim's name is very sensitive until the legal brief is filed at which point the victim's name is public knowledge.

In order to prevent accidental and/or intentional disclosures of the mission critical data, these conventional computing environments may employ data loss prevention (DLP) technologies to monitor and control data communications between computing devices such that sensitive information is retained within a specific group (e.g., Board of Directors). For example, DLP agents (i.e., software modules) may be installed on workstations (e.g., computers that are connected to a server, such as an email server, for use by end users) to prevent transmission of sensitive information through email, the Internet and/or removable data storage (e.g., flash memory). An administrator typically installs and pre-configures the DLP agents on the client computers before deployment.

Unfortunately, the DLP technologies are limited to preventing disclosure of the sensitive information from these pre-configured client computers. Since virtual machines may be instantiated by end users and hosted on any computer, the DLP agents cannot be configured on these virtual machines in real time. In fact, the administrator may not realize that such virtual machines are being hosted. Furthermore, various files that form an image of a virtual machine cannot be scanned for the sensitive information by the DLP technologies. For example, the DLP technologies are unable to scan a virtual disk when an associated virtual machine is currently in operation.

Hence, the virtual machine files (e.g., virtual disks and/or snapshots) must be provisioned offline, which reduces productivity, increases costs and wastes valuable computer resources. At any point in time before or after the virtual machines are brought online, the sensitive information may be disclosed as a consequence. For example, a disgruntled employee may purposefully transmit social security numbers through encrypted communication protocols (e.g., HTTPS, secure instant message (IM) and/or the like) supported by the virtual machines, which bypasses any type of DLP technology employed at a host computer or any network device (e.g., a gateway).

Because the virtual machine files may be freely transported by the end users, these DLP technologies are unable to prevent data loss on one or more virtual machines that are hosted without administrator control. There are many reasons for these end users to desire mobility. For example, salespeople and information technology support employees transfer copies of virtual machine files to laptops in order to demonstrate working products to prospective customers. As another example, a software engineer may copy the virtual machine files to a home desktop computer such that a software program may be executed and tested on the virtual machine. Permitting end users to host the one or more virtual machines on remote computers (e.g., personal laptops) may reduce operational costs and labor expenses.

Therefore, there is a need in the art for a method and apparatus for protecting sensitive information from disclosure through virtual machine files.

SUMMARY OF THE INVENTION

Embodiments of the present disclosure generally include a method and apparatus for protecting sensitive information from disclosure through virtual machine files. In one embodiment, the method for protecting sensitive information from disclosure through virtual machine files is provided. The method includes processing virtual machine files using at least one processor to access data objects in memory that are associated with at least one virtual machine, examining the data objects using the at least one processor in accordance with a data loss prevention policy in the memory to identify sensitive information within at least one data object of the data objects in the memory and securing, using the at least one processor, the sensitive information within the virtual machine files in the memory.

In some embodiments, mapping information is generated in the memory associated with the data objects and at least one virtual disk. In some embodiments, an address scan of the data objects within the at least one virtual disk is performed using the mapping information and the at least one processor. In some embodiments, the sensitive information is inaccessible after the securing step. In some embodiments, at least one of quarantining, deleting or encrypting at least one of the at least one data object or at least one portion of at least one virtual disk comprising the at least one data object is performed using the at least one processor.

In some embodiments, at least one snapshot of at least one virtual disk that is associated with the at least one virtual machine is generated and mappings between the data objects and locations within the at least one virtual disk and the at least one snapshot are determined in the memory using the at least one processor. In some embodiments, the at least one virtual machine is not operational during the processing step. In some embodiments, the at least one data object is transformed.

In another embodiment, an apparatus for protecting sensitive information from disclosure through virtual machine files is provided. The apparatus includes means for accessing virtual machine files in memory to determine mappings between data objects and at least one virtual disk using at least one processor. The apparatus further includes means for examining, using the at least one processor, the data objects within the at least one virtual disk using the mappings, identifying sensitive information within at least one data object based on a data loss prevention policy in the memory using the at least one processor and remediating a virtual disk that comprises the at least one data object of the at least one virtual disk using the at least one processor.

In some embodiments, the apparatus further includes means for generating at least one snapshot of the virtual disk using the at least one processor when the at least one virtual machine associated with the at least one virtual disk is operational. In some embodiments, the apparatus further includes means for determining the mappings when at least one virtual machine associated with the at least one virtual disk is not operational. In some embodiments, the apparatus further includes a means for performing at least one of quarantining, deleting or encrypting the at least one data object using the at least one processor. In some embodiments, the apparatus further includes means for transforming the at least one data object using the at least one processor. In some embodiments, means for performing an address scan of the at least one virtual disk to detect the sensitive information using the at least one processor.

In yet another embodiment, a computer-readable-storage medium is provided. The computer-readable-storage medium comprises one or more executable instructions that, when executed by at least one processor, causes the at least one processor to access mapping information associated with data objects within virtual machine files in memory, wherein the virtual machine files comprising a plurality of virtual disks, scan the data objects using a data loss prevention policy for identifying sensitive information and remediate at least one virtual disk comprising the sensitive information of the plurality of virtual disks. In some embodiments, the executable instructions may also transform the at least one virtual disk comprising the sensitive information.

In some embodiments, the executable instructions may also perform at least one of deleting, quarantining or encrypting at least one data object comprising the sensitive information of the data objects. In some embodiments, the executable instructions may map the data objects to locations within the virtual machine files when at least one virtual machine associated with the at least one virtual disk is operational. In some embodiments, the executable instructions may halt at least one virtual machine that is operational, create at least one snapshot of at least one virtual disk associated with the at least one virtual machine and generate mapping information associated with the data objects, the at least one snapshot and the at least one virtual disk. In some embodiments, the executable instructions may perform an address scan on the at least one virtual disk and the at least one snapshot using the mapping information and identify the sensitive information within at least one data object of the data objects based on the data loss prevention policy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
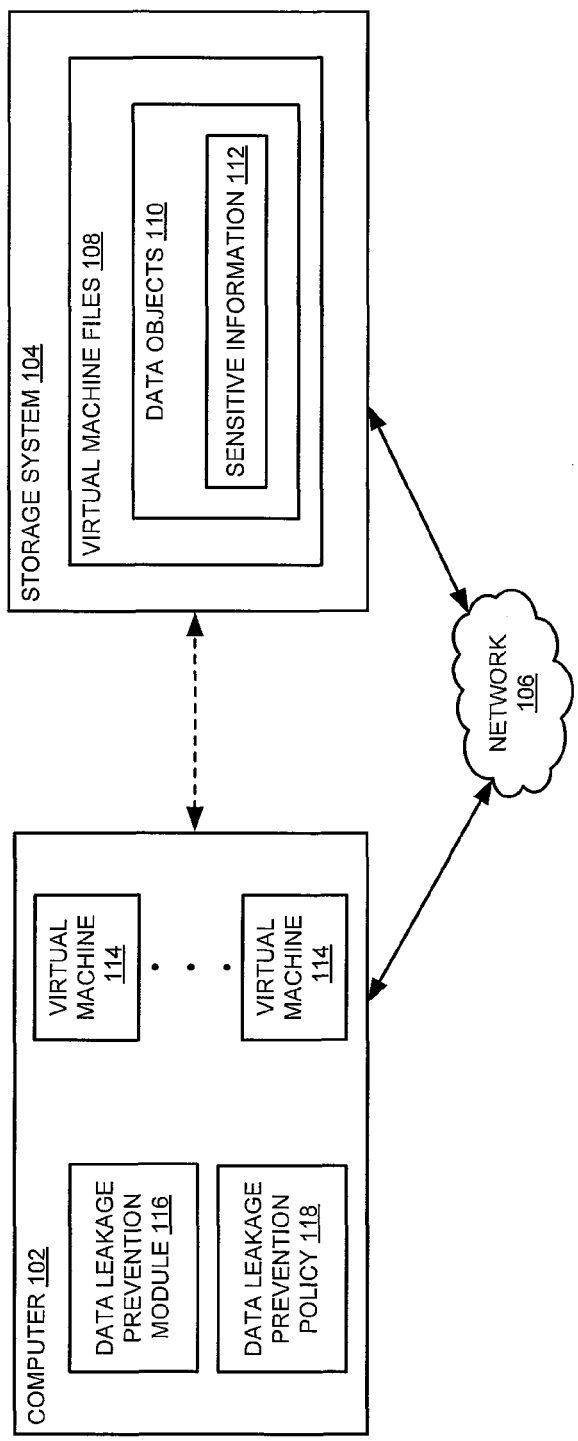
FIG. 1 is a block diagram of a system for protecting sensitive information from disclosure through virtual machine files according to one or more embodiments.

The present disclosure describes various embodiments of a method and apparatus for protecting sensitive information from disclosure through virtual machine files. A computer hosting virtual machines to end users may be configured to detect and secure the sensitive information within the virtual machine files in real time using a data loss prevention (DLP) module and a data loss prevention (DLP) policy. For example, such a computer may be a desktop computer that stores the virtual machine files and operates the virtual machines associated with the virtual machine files. Furthermore, a laptop computer may remotely connect to the desktop computer in order to access data objects within the virtual machine files and perform operations associated with various software applications as explained further below.

In some embodiments, as soon as the virtual machines files are stored in the computer and/or a storage system coupled to the computer, the DLP module remediates any virtual disks (i.e., virtual disk files, such as .VMDK files for VMWARE) that include the sensitive information according to the DLP policy. In one or more embodiments, the sensitive information may be prevented by the DLP module from being copied to another computer without destroying the virtual machine files. For example, the DLP module may quarantine the virtual disk to a designated area of computer memory (e.g., a secure remote storage device outside of the computer, a portion of local computer memory within the computer and/or the like), but enables the virtual disk to remain recoverable at a later point in time. After a period of time elapses, the sensitive information may no longer need to be secured and the end users may return to using the virtual disk without any restraints. In some embodiments, the DLP module may delete the virtual disk to prevent the public disclosure of the sensitive information.

In some embodiments, the DLP module may encrypt the virtual disk using various encryption techniques (e.g., public key encryption) to prevent unauthorized entities (e.g., rival company employees, individuals without security clearance and/or the like) from examining the sensitive information within the virtual disk. As a result, the sensitive information is secure from public disclosure within the encrypted virtual disk. The end user may transport the entire encrypted virtual disk onto a remote computer and proceed to host the virtual machine provided a corresponding decryption technique is implemented. In other words, the end user may continue to use the encrypted virtual disk and/or the sensitive information within it as long as the remote computer is an authorized host. In some embodiments, only data objects (e.g., files) that include the sensitive information are encrypted as explained below. Accordingly, the end user may use any remaining portions of the virtual disk and/or operate the virtual machine on an unauthorized host while the sensitive information remains inaccessible and unreadable.

Furthermore, the DLP module may be permitted to write data to the virtual disk. In some embodiments, the DLP module identifies one or more data objects that include the sensitive information based on the DLP policy. The DLP module performs one or more remediation techniques to secure the sensitive information within the virtual disk, such as encrypting, quarantining and/or deleting the one or more data objects that contains the sensitive information. After the remediation of the virtual disk, the end users may return to operating a virtual machine associated with the virtual disk. Even though the one or more data objects are to be quarantined, deleted and/or encrypted, the end users may continue to access remaining portions of the virtual disk.

FIG. 1 is a block diagram of a system 100 for protecting sensitive information from disclosure through virtual machine files according to one or more embodiments. The system 100 may include a computer 102 and a storage system 104 in which each is coupled one another through a network 106.

The computer 102 may be a type of computing device (e.g., a laptop, a desktop, a terminal and/or the like) for hosting virtual machines 114 to the end users. As described in detail further below, the computer 102 includes a data loss prevention module 116 and a data loss prevention policy 118, which may be utilized to monitor the virtual machines 114 and detect the sensitive information 112. In one or more embodiments, the computer 102 provides the virtual machines 114 to end users as remote desktops. Alternatively, the computer 102 may be a desktop (e.g., a workstation) on which the end users store virtual disks associated with the virtual machines 114.

For example, salespeople may use a laptop computer that operates as a remote desktop through the salesman may send emails to customers using a Remote Desktop Protocol (RDP). The laptop computer may access a virtual machine hosted by the computer 102 in order to operate an software application, such as various email software modules. As another example, the end user may perform a physical to virtual conversion of the desktop computer such that a copy of a physical disk is stored in the computer 102 and/or the storage system 104 as a virtual disk file as described further below.

The storage system 104 may include a plurality of storage devices organized into at least a portion of a Storage Area Network (SAN) as explained further below. The storage system includes virtual machine files 108, which are used to instantiate virtual machines. The virtual machine files 108 may include various data objects 110 (e.g., file system objects, such as data files, directories and/or metadata). As described in detail further below, various ones of the data objects 110 may include sensitive information 112 (e.g., confidential financial information, privileged legal information, social security numbers and/or the like). Alternatively, the storage system 104 may be directly coupled to the computer 102 (e.g., a local hard disk drive, a removable Universal Serial Bus (USB) data storage device and/or the like).

The network 106 comprises a communication system that connects computers by wire, cable, fiber optic, and/or wireless links facilitated by various types of well-known network elements, such as hubs, switches, routers, and the like. For example, the network 106 may be part of a Local Area Network (LAN) (e.g., the Internet or intranet) using various communications infrastructure such as Ethernet, WiFi, WiMax, General Packet Radio Service (GPRS), and the like. The network 106 and the storage system 104 may form a portion of a Storage Network Area (SAN) using various communications infrastructure such as Ethernet, Fibre Channel, InfiniBand, Internet Small Computer System Interface (iSCSI) and/or the like. As an example, such a Storage Area Network (SAN) may include Fibre Channel switches and/or ISCSI block storage devices.

The virtual machine files 108 (e.g., a .VMX file, a .VMDK file, a .VHD file and/or the like) are utilized (e.g., mounted) by virtualization software modules (e.g., a Hypervisor, a Virtual Machine Monitor (VMM) and/or the like) to generate and monitor one or more virtual machines, which are abstract representations of physical machines. Hence, several virtual machines 114 may be powered on and running within a single physical machine, such as the computer 102. These virtualization software modules create and maintain a virtualization layer between each virtual machine and local computer resources at the physical machine and/or remote computer resources (e.g., Logical Units (LUNs) coupled to a SAN).

The virtualization layer multiplexes the local and/or remote computer resources to each and every one of the virtual machines 114 operating within the computer 102. Computer memory on the computer 102 maintains a memory state for the virtual machines 114. In addition, the virtual machines 114 may use local computer resources on the computer 102 and the client 102 as well as networked remote computer resources on the storage system 104. Thus, the virtualization layer generated by the virtualization software modules facilitates the necessary "virtual machine" abstraction.

The data loss prevention (DLP) module 116 includes software code that resides within the computer 102. In some embodiments, the DLP module 116 is executed to examine the data objects 110 and prevent any undesired disclosure of the sensitive information 112 through the virtual machine files 108 in accordance with a data loss prevention (DLP) policy 118. As explained in further detail below, the DLP module 116 identifies the sensitive information 112 and, as needed, remediates the virtual machine files 108 to secure the sensitive information 112.

Figure 2:
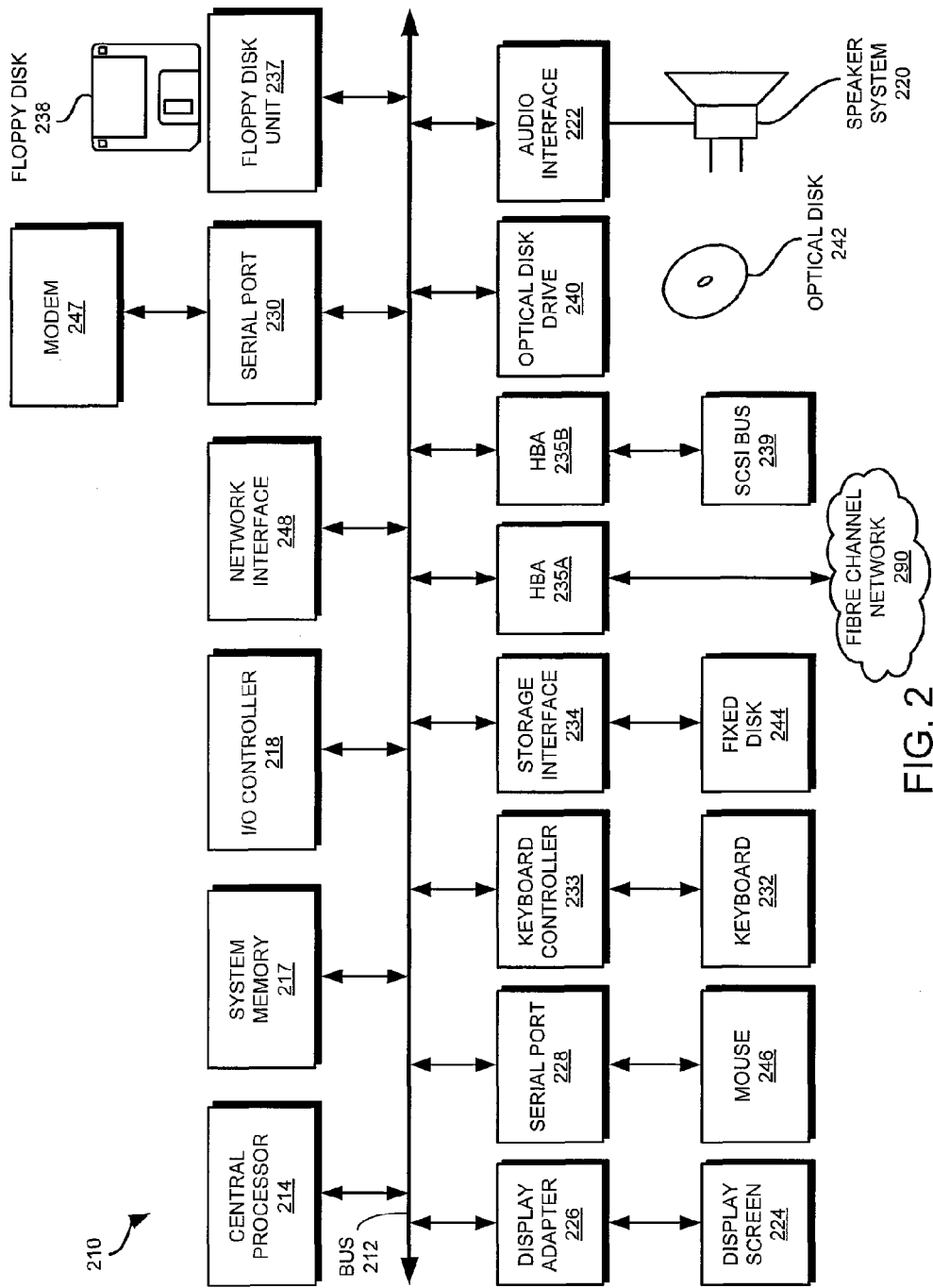
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 102 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
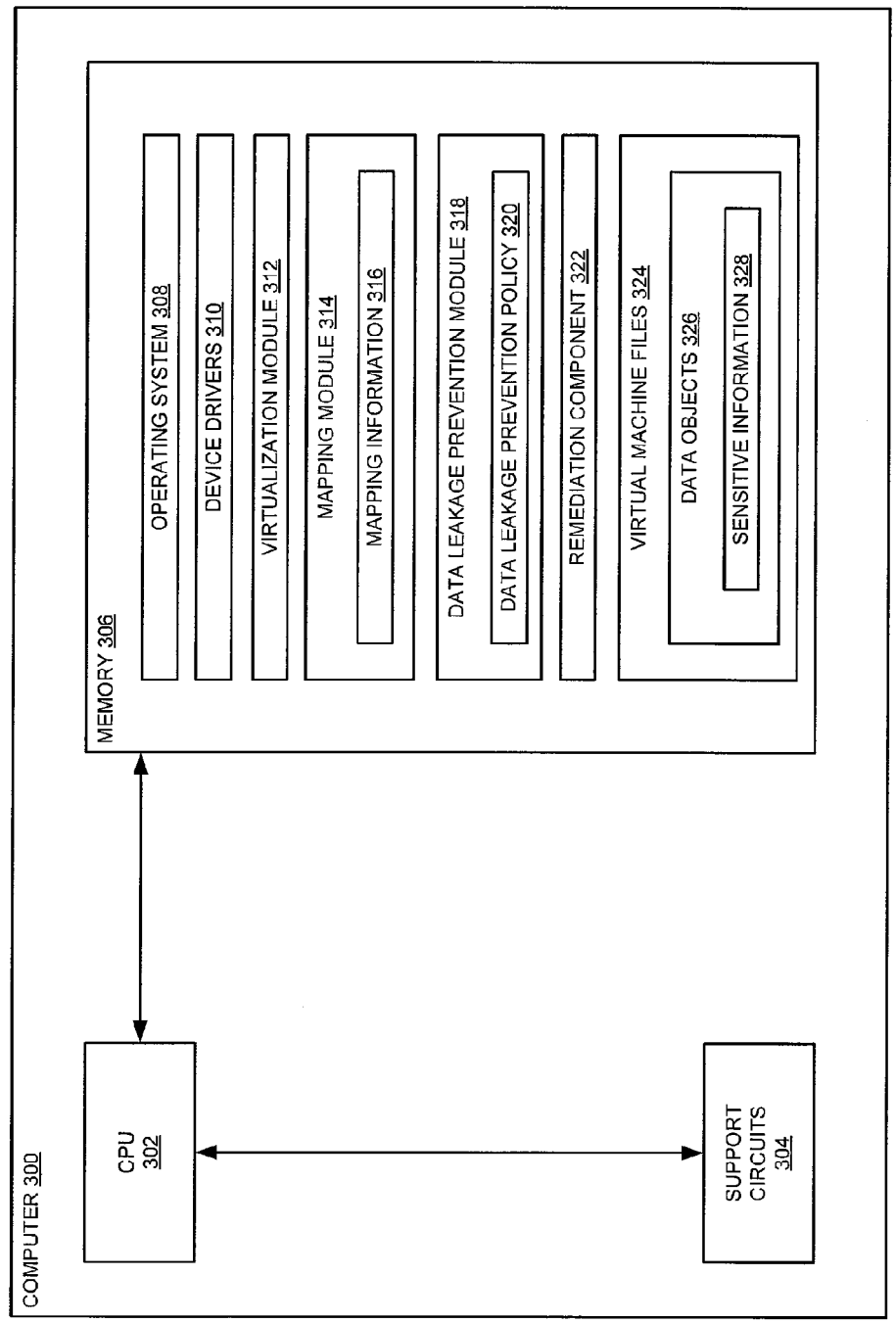
FIG. 3 is a block diagram of a server for protecting sensitive information from disclosure through virtual machine files according to one or more embodiments.

FIG. 3 is a block diagram of a computer 300 for protecting sensitive information from disclosure through virtual machine files according to one or more embodiments. The computer 300 is a type of computing device (e.g., a laptop, a desktop and/or the like) that comprises a central processing unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes various data and software packages, such as an operating system 308, device drivers 310, a virtualization module 312, a mapping module 314, mapping information 316 and a data loss prevention (DLP) module 318, a data loss prevention (DLP) policy 320, a remediation component 322, virtual machine files 324, data objects 326 and sensitive information 328.

The operation system 308 generally manages various computer resources (e.g., network resources, data storage resources, file system resources and/or the like). The operating system 308 is configured to execute operations on one or more hardware and/or software components, such as network interface cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute these various file system and/or storage operations. As an example, the operating system 308 may utilize a device driver associated with a NIC card to communicate data to another computer and/or storage device as explained further below.

The virtualization module 312 includes software code (e.g., processor executable instructions) that is executed by the CPU 302 to facilitate creation of a virtualization layer (e.g., a hypervisor) between one or more virtual machines (e.g., the virtual machines 114 of FIG. 1) and local and/or remote computer resources (e.g., computer memory, physical processors, hard disks and/or the like) associated with the computer 300 as well as any network storage devices as explained further below. The virtualization layer multiplexes the local and/or remote computer resources to the one or more virtual machines running in the computer 300. The operating system 308 cooperates with the virtualization module 312 to process the virtual machine files 324 in order to operate the one or more virtual machines.

The mapping module 314 includes software code (e.g., processor executable instructions) that is configured to access the data objects 326 (e.g., files, directories and/or metadata) that are arranged within the virtual machine files 324 (i.e., one or more virtual disks, such as .VMDK files). The mapping module 314 may be executed by the CPU 302 to generate the mapping information 316 associated with these data objects 326 (e.g., the data objects 110 of FIG. 1). Because the one or more virtual machines utilize guest operating systems to create, modify and/or delete the data objects 326, the operating system 308 cannot issue native commands to access the data objects 326. Therefore, the operating system 308 cooperates with the mapping module 314 (e.g., VMWARE DiskMount utility) to access the virtual machine files 326 and map the data objects 326 to locations (e.g., logical and/or physical addresses) within the virtual machine files 324, such as one or more virtual disks. Then, the DLP module 318 stores these locations in the mapping information 316. For example, the mapping information 316 may include an extent (e.g., an offset and a size) for each and every addressable data block associated with the data objects 326 within the one or more virtual disks.

According to one or more embodiments, the data loss prevention (DLP) module 318 includes software code (e.g., processor executable instructions) that is configured to prevent disclosure of sensitive information through the one or more virtual machines hosted by the computer 300. The DLP module 318 (e.g., the DLP module 116 of FIG. 1) is executed by the CPU 302 to access the data loss prevention (DLP) policy 320 (e.g., the DLP policy 118 of FIG. 1) in the memory 306 for identifying the sensitive information 328 within the data objects 326 that are arranged within the one or more virtual disks. The DLP policy 320 defines various degrees of sensitivity for data utilized by end users. For example, the DLP policy 320 indicates information having a high level of sensitivity (e.g., social security numbers) as well as a low level of sensitivity (e.g., phone numbers). Furthermore, the DLP module 318 processes the DLP policy 320 to determine whether a particular virtual disk is to be remediated due to the high sensitivity of information within one or more of the data objects 326.

Alternatively, the DLP module 318 may be an agent installed on an email client (e.g., a MICROSOFT Outlook plug-in), an email server (e.g., MICROSOFT Exchange Server) or an endpoint device, such as a gateway or a USB driver. Furthermore, the DLP module 318 may include software code that is designed to monitor the computer 300 for the sensitive information 328 at any protocol level: network level (e.g., TCP/IP), session level (e.g., HTTP, FTP) or application level (e.g., email software, such as GOOGLE Gmail or MICROSOFT Outlook).

In operation, the DLP module 318 examines the data objects 326 in accordance with the DLP policy 320 using the mapping information 316. In one embodiment, the DLP module 318 may perform an address scan of the data objects 326 within one or more virtual disks in sequential order (i.e., logically). For example, the DLP module 318 calls native data read commands associated with the operating system 308 to access a particular data object located at one or more extents and applies the DLP policy 320 to identify sensitive information (e.g., the sensitive information 112 of FIG. 1) within the particular data object. If the particular data object includes the sensitive information, the DLP module 318 may execute the remediation component 322 in the memory 306 using the CPU 302 to secure the sensitive information. The remediation component 322 communicates, to a storage system controller, one or more instructions for securing the sensitive information 328 as described further below.

According to one or more embodiments, the DLP module 318 remediates a virtual disk that includes the sensitive information in accordance with the DLP policy 320. The DLP module 318 may alter or transform the entire virtual disk or a portion thereof, such that the sensitive information is inaccessible to the end user. In one embodiment, the DLP module 318 instructs the remediation component 322 to delete, quarantine and/or encrypt the entire virtual disk or portions thereof in order to prevent outbound transmissions or any other undesired disclosure of the sensitive information. The remediation component 322 may issue such instructions through the virtualization layer provided by the virtualization module 312. In an alternative embodiment where the virtualization module 312 grants WRITE access to the DLP module 318 for the data objects 326 within the virtual disk, the remediation component 322 issues instructions to delete, quarantine and/or encrypt one or more data objects 326 comprising the sensitive information 328.

In some embodiments, the DLP policy 320 includes one or more unique patterns (e.g., collections of words) that are used to distinguish the sensitive information 328 from any other information. For example, the DLP policy 320 may define one or more word patterns (e.g., 'Security Exchange Filing') that specify various data having a very high sensitivity level. The DLP policy 320 may also define one or more formats (e.g., a sixteen digit number is most likely to be a credit card number, a nine digit number arranged as "XXX-XX-XXXX" is most likely to be a social security number and/or the like) that specify the data having the very high sensitivity level. In some embodiments, before the DLP module 318 remediates the virtual machine files 324 in order to secure the sensitive information 328, the DLP module 116 may examine the DLP policy 118 to determine a current sensitivity level of one or more data objects that include the sensitive information 328 of the data objects 326. For example, the DLP policy 320 may indicate a time period (e.g., an event, a fixed date and/or time, a number of units of time (e.g., hours, days months, years and the like)) at which moment various data is no longer sensitive (i.e., expired). A portion of the sensitive information 328 may not be confidential because an event occurred where the particular document was disclosed to the public.

As an example, the DLP module 318 examines a MICROSOFT word file and identifies a string "Confidential and/or Privileged Information". Based on the DLP policy 320, the identification of such a string represents a very strong likelihood that the file includes very sensitive information. The DLP module 318 examines the DLP policy 320 to determine one or more remediation techniques for the file and/or a virtual disk that includes the file. Since public disclosure of the word file may be very disastrous and cause adverse consequences, the DLP policy 320 indicates that the word file and/or the virtual disk are to be deleted. Subsequently, the DLP module 318 instructs the operating system 308 to remove the word file and/or the virtual disk from a storage system. The operating system 308 issues native commands, which are converted into guest operating system commands by the virtualization module 312 and subsequently applied to the virtual disk as described further below.

Figure 4:
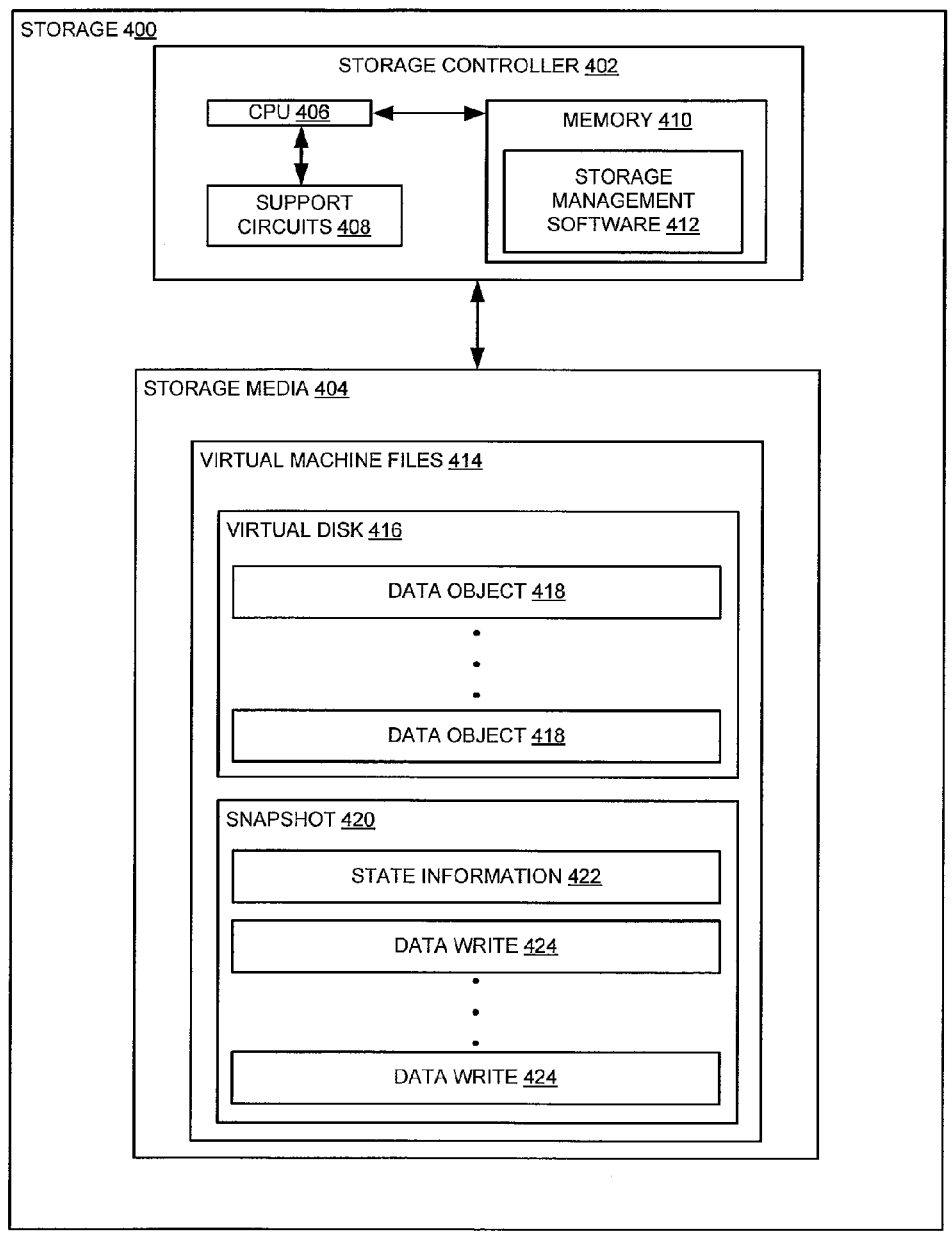
FIG. 4 is a block diagram of a storage system for performing storage operations to remediate virtual machine files that include sensitive information according to one or more embodiments.

FIG. 4 is a block diagram of a storage system 400 for performing storage operations to remediate virtual disks that include sensitive information according to one or more embodiments. The storage system 400 generally includes various components (i.e., hardware and software) that are configured to manage storage resources.

The storage system 400 includes a storage controller 402 and storage media 404. The storage media 404 may include one or more data storage devices (e.g., hard disk drives, optical drives, magnetic tape drives, a storage array (e.g., a disk array in a RAID configuration) and/or the like). The storage controller 402 may include a CPU 406 (e.g., microcontroller or microprocessor), various support circuits 408 and memory 410. The storage controller 402 further includes storage management software 412 that creates an interface (e.g., Integrated Drive Electronics/AT Attachment (IDE/ATA), Small Computer Systems Interface (SCSI) and/or the like) to the one or more data storage devices for one or more computing devices (e.g., physical machines and/or virtual machines).

The storage system 400 facilitates persistent storage of computer data (e.g., data objects) as virtual machine files 414, which may be generally referred to as "virtual machine images". In one embodiment, the storage media 404 may include one or more files of various types (e.g., .VHD, .VMDK, .VMX, .AVHD and/or the like) that encapsulate and represent a volume, a hard disk and/or a virtual machine in a proprietary format. For example, the storage media 404 may include a plurality of virtual disks (i.e., virtual disk files, such as .VMDK files) as explained further below. The virtual machine files 414 may processed by virtualization software (e.g., the virtualization module 312 of FIG. 3) in order to create one or more virtual machines that run guest operating systems to be hosted by a server (e.g., the computer 300 of FIG. 3).

In one embodiment, the virtual machine files 414 include a virtual disk 416 (e.g., a .VMDK file) associated with a particular virtual machine. The virtual disk 416 includes a plurality of data objects 418 (e.g., data files) that are arranged in accordance with a file system. A guest operating system running within the particular virtual machine utilizes such a file system to access, write, modify and/or read the plurality of data objects 418. The virtual disk 416 may be processed by a mapping module (e.g., the mapping module 312 of FIG. 3), which determines mappings between the plurality of data objects 418 and locations within the virtual disk 416. As such, these mappings indicate one or more extents that form each and every one of the plurality of data objects 418.

In another embodiment, the virtual machine files 414 may include a snapshot 420 associated with a virtual machine that is currently running (e.g., powered on) and being utilized by an end user. The snapshot 420 includes one or more files of various types that represent such a virtual machine at a specific point-in-time. The snapshot 420 reflects updates to the virtual disk 416 (e.g., new files, metadata changes, data writes and/or the like). Accordingly, the snapshot 420 includes state information 422 for defining a memory state associated with file system operations performed by the virtual machine as well as any supported guest operating system processes. The snapshot 420 may be generated by the virtualization software (e.g., the virtualization module 312 of FIG. 3) such that working memory (e.g., RAM) and supporting guest operating process information are stored in the state information 422 (e.g., as a BIN file and a VSV file, respectively). Furthermore, the snapshot 420 may include a plurality of data writes 424 that are children of the data objects 418 within the virtual disk 416. For example, the snapshot 420 may include a differencing virtual disk (e.g., an .AVHD file) for storing the plurality of data writes 424 and serving as an updated virtual disk for the virtual machine in operation.

In one embodiment, a data loss prevention (DLP) module (e.g., the DLP module 318 of FIG. 3) accesses and scans the virtual disk 416 and/or the snapshot 420 are accessed and scanned for sensitive information based on a data loss prevention (DLP) policy (e.g., the DLP policy 320 of FIG. 3). The DLP module may use the virtualization software to mount the virtual disk 416 and/or the snapshot 420 to perform an address scan of the plurality of data objects 418 along with the plurality of data writes 424. If the plurality of data objects 418 and/or the plurality of data writes 424 are determined to include any sensitive information, the storage controller 402 processes instructions that are issued by the DLP module for remediating the virtual disk 416 such that the sensitive information is secure.

After the virtual machine stops running, the storage management software 406 may execute storage operations that delete, quarantine and/or encrypt the virtual disk 416 according to one or more embodiments. If the virtual disk 416 is quarantined or encrypted, the virtual disk 416 may be recovered for further use at a later point-in-time. Thus, the storage management software 406 may render the virtual disk 416 useless and inaccessible for any unauthorized entity. In other embodiments where the DLP module is provided WRITE access rights to the virtual disk 416, the storage management software 406 may execute storage operations that delete, quarantine and/or encrypt each and every data object that includes the sensitive information of the plurality of data objects 418. Subsequently, the storage management software 406 may be instructed to delete the snapshot 420.

Figure 5:
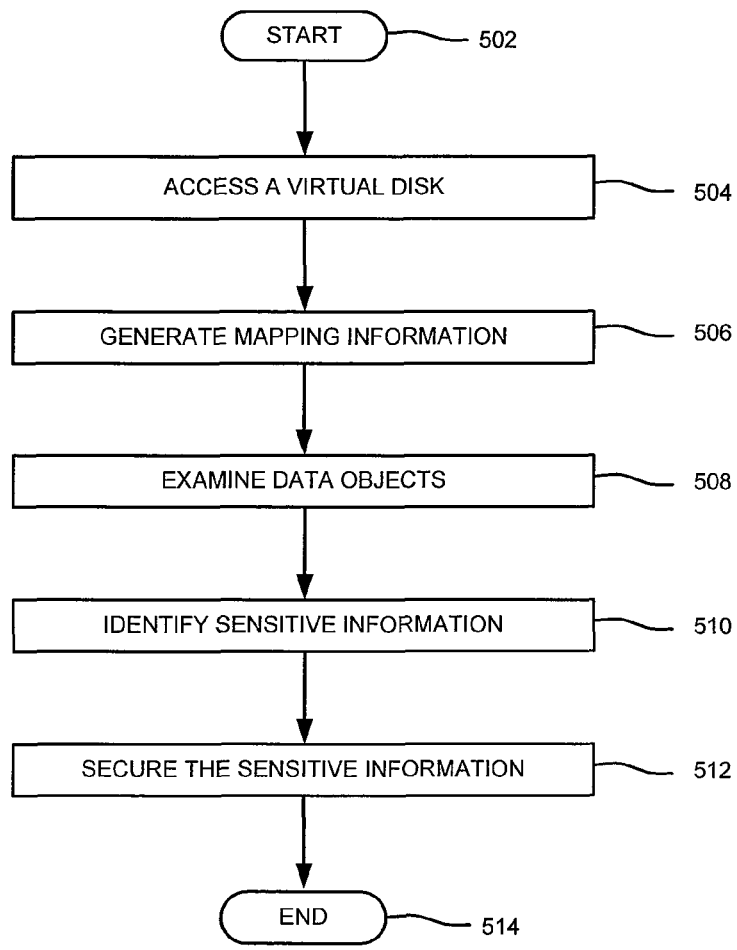
FIG. 5 is a flow diagram of a method for protecting sensitive information from disclosure through virtual machine files according to one or more embodiments.

FIG. 5 is a flow diagram of a method 500 for protecting sensitive information from disclosure through virtual machine files according to one or more embodiments. In some embodiments, virtualization software modules (e.g., the virtualization module 312 of FIG. 3) in computer memory are executed by one or more processors to create and operate a virtualization layer as explained in the present disclosure. These virtualization software modules provide various virtualization functions for mounting virtual machine files (e.g., the virtual machines 112 of FIG. 1 or the virtual machine files 414 of FIG. 4) in the computer memory and operating virtual machines (e.g., the virtual machines 114 of FIG. 1), which are hosted by a computer (e.g., the computer 102 of FIG. 1) for end users.

The method 500 starts at step 502 and proceeds to step 504. A data loss prevention (DLP) module (e.g., the DLP module 116 of FIG. 1 and the DLP module 318 of FIG. 3) in the computer memory is executed by the one or more processors. At step 504, a virtual disk (e.g., the virtual disk 416 of FIG. 4) associated with a virtual machine is accessed. The data loss prevention (DLP) module calls a mapping module (e.g., the mapping module 314 of FIG. 3) in order to process the virtual machine files and mount the virtual disk in the computer memory according to one or more embodiments.

In some embodiments, the virtual machine associated with the virtual disk may be powered off and not running within the computer at the moment the DLP module is executed. Hence, the computer is not hosting the virtual machine for any end user. In some embodiments, the computer may not be a virtual machine host and may only provide security resources, such as the remediation techniques as understood by those skilled in the art with the benefit of the present disclosure. Alternatively, the virtual machine may be unavailable. For example, an end user may have copied a virtual disk file to the computer memory within the computer (e.g., the computer 102 of FIG. 1). As another example, the virtual machine may be deleted after the virtual disk is created. Nonetheless, the mapping procedure facilitates securing the sensitive information within the virtual machine files without an operational virtual machine.

In some embodiments, the virtual machine may be powered on and currently operational at the computer. The DLP module utilizes one or more commands that are executed by the virtualization software modules to halt the virtual machine, which enables access to virtualized computer resources on the computer (e.g., memory, processors and/or the like). In effect, the virtual machine stops all operations and ceases to provide services to the end user. For example, the DLP module may communicate a freeze command to the virtual machine in order to access a portion of the memory that reflects a memory state associated with the frozen virtual machine as well as any updates to the data objects on the virtual disk (e.g., subsequent data writes). Then, the DLP module calls various virtualization functions in the virtualization layer using the one or more processors to generate a snapshot (e.g., the snapshot 420 of FIG. 4) of the frozen virtual machine in the memory at the computer as described in detail within the present disclosure.

At step 506, mapping information (e.g., the mapping information 316 of FIG. 3) associated with data objects that are arranged within the virtual disk is generated. In some embodiments, the data loss prevention (DLP) module calls the mapping module to mount the virtual disk and/or the snapshot in order to access the data objects (e.g., the data objects 110 of FIG. 1 or the data objects 418 of FIG. 4) using the one or more processors. The DLP module may communicate operating system commands to the mapping module, which are subsequently converted into operating system commands that are native to a file system utilized by the virtual disk (i.e., guest operating system commands). In one embodiment, the DLP module issues read operations for various metadata blocks (e.g., Master File Table (MFT) records) using the one or more processors in order to determine mappings between each and every data object and locations within the one or more virtual disks. Then, the DLP module stores such mappings in the mapping information in the memory. For example, the mapping information may include an extent (e.g., an offset from a fixed physical address within a virtual disk file and a size in bytes) associated with a particular data object.

At step 508, the data objects are examined. Based on a DLP policy (e.g., the DLP policy 118 of FIG. 1 or the DLP policy 320 of FIG. 3), the DLP module processes the mapping information using the one or more processors to identify one or more data objects to be examined in some embodiments. Then, the DLP module instructs the mapping module to perform read operations on the one or more data objects using one or more corresponding extents as indicated by the mapping information. In some embodiments, the DLP module processes the mapping information to perform an address scan of the one or more virtual disks in which each logical portion (e.g., data block) of the one or more data objects is examined sequentially using the one or more processors. In some embodiments, the DLP module examines contents of the one or more data objects to detect and secure sensitive information in accordance with the DLP policy using the one or more processors.

At step 510, sensitive information is identified. In some embodiments, the DLP module recalls and executes instructions to implement the DLP policy and applies the DLP policy to the one or more data objects to assess sensitivity levels for various portions of the one or more data objects using the one or more processors. If the DLP module identifies a portion of any data object that exceeds a certain threshold sensitivity level as defined in the DLP policy, the DLP module uses the one or more processors to perform one or more remediate techniques on the virtual disk that includes the identified object.

At step 512, the sensitive information (e.g., the sensitive information 112 of FIG. 1) is secured. In some embodiments, a remediation component (e.g., the remediation component 322 of FIG. 3) in the memory is executed by the one or more processors. The DLP module may instruct the remediation component to issue instructions for securing the sensitive information within the virtual disk. The remediation component calls functions provided by various device drivers (e.g., the device drivers 310 of FIG. 3) in order to translate one or more operating system commands into storage operations to be performed at a storage system that stores the virtual disk.

In some embodiments, the remediation component is executed to perform deleting, encrypting and/or quarantining the virtual disk using the one or more processors. For example, the remediation component may instruct the storage system to quarantine a portion of the virtual disk, which may causes an entire virtual disk file to be quarantined. In some embodiments, the remediation component instructs the operating system and/or the storage system to move the portion of the virtual disk (e.g., one or more data objects) to a pre-designated area of the computer memory (e.g., the memory 306 of FIG. 3) and/or the storage media (e.g., the storage media 404 of FIG. 4), respectively. As another example, the remediation component instructs the operating system and/or the storage system to encrypt the virtual disk using various cryptography techniques (e.g., public key cryptography). Accordingly, the virtual disk may be inaccessible to the end users as well as any unauthorized entity. The virtual disk, however, is not destroyed and may be recovered at a later point in time.

In some embodiments, the virtual disk is destroyed to prevent public disclosure of the sensitive information. For example, the remediation component instructs the operating system and/or the storage system to delete the virtual disk from the computer memory and/or the storage media, respectively. Because the entire virtual disk is removed, the end user may not be able to create an associated virtual machine or recover any computer data (e.g., one or more data objects).

In some embodiments, the remediation component may be instructed to perform deleting, encrypting or quarantining each and every data object that includes the sensitive information in the memory using the one or more processors. As such, the remediation component alters the virtual disk to secure these data objects. In some embodiments, these data objects may be inaccessible to the end user. If these data objects are encrypted, deleted from and/or moved to the pre-designated area of the computer memory and/or the storage media, respectively, the end user may no longer use these data objects; but the end user may continue to operate the virtual machine and use any remaining data objects within the virtual disk. At step 514, the method 500 ends.

Figure 6:
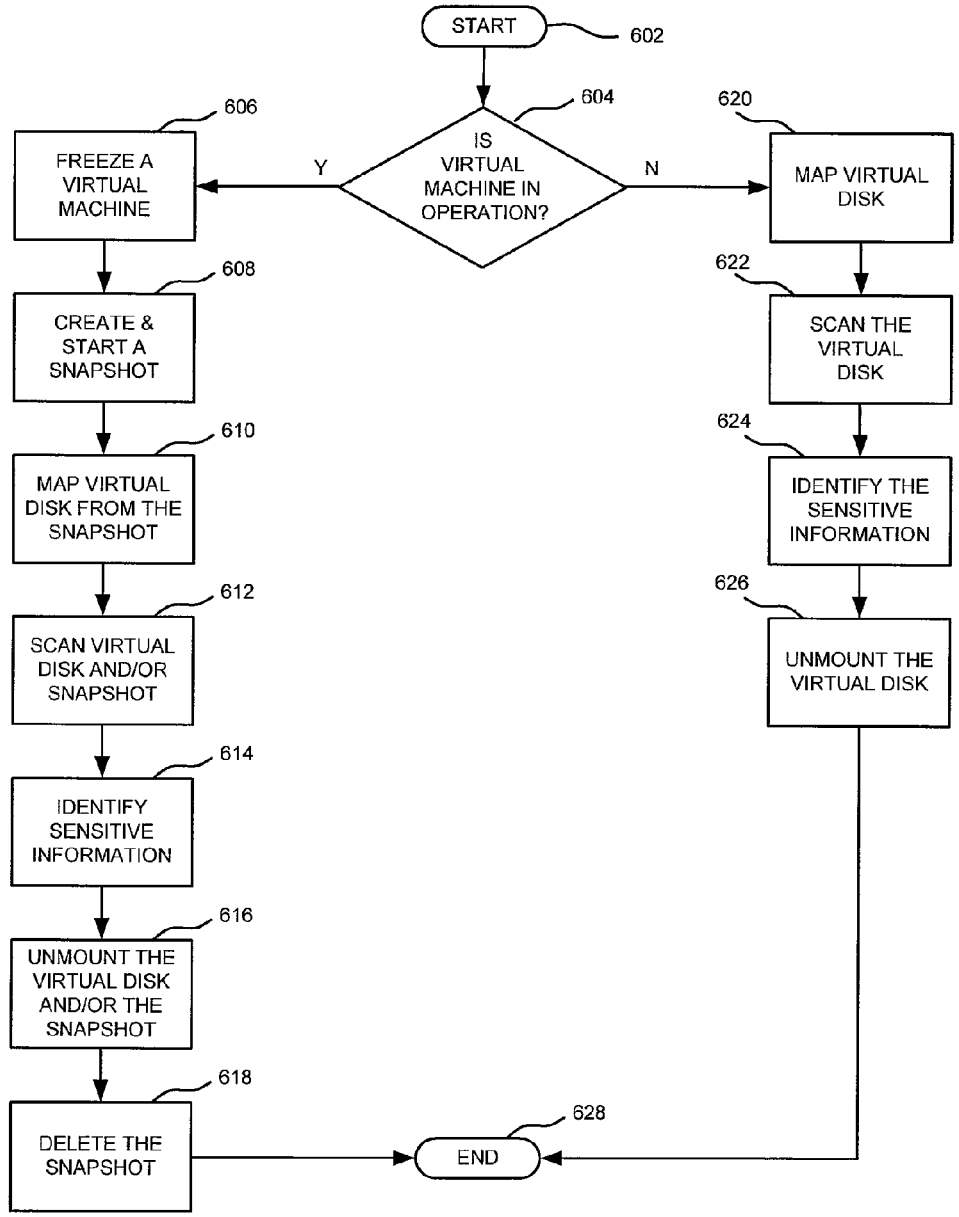
FIG. 6 is a flow diagram of a method for examining a virtual disk to identify sensitive information according to one or more embodiments.

FIG. 6 is a flow diagram of a method 600 for examining a virtual disk to identify sensitive information according to one or more embodiments. The method 600 starts at step 602 and proceeds to step 604.

At step 604, a determination is made as to whether a virtual machine is in operation. As explained in the present disclosure, a computer (e.g., the computer 300 of FIG. 3) may host one or more virtual machines (e.g., the virtual machines 114 of FIG. 1) that interface with one or more computer users. These virtual machines may be runtime instances of virtual machine files (e.g., the virtual machine files 108 of FIG. 1) that include one or more virtual disks (e.g., the virtual disk 416 of FIG. 1). Not every virtual disk, however, may be utilized to create the one or more virtual machines. As such, a virtual machine that is associated with a particular virtual disk may or may not be in operation at a given point in time. If the virtual machine is determined to be in operation, the method 600 proceeds to step 606.

At step 606, the virtual machine in operation is instructed to freeze. In some embodiments, a DLP module (e.g., the DLP module 116 of FIG. 1 and the DLP module 318 of FIG. 3) utilizes one or more commands that are executed by virtualization software modules to halt the virtual machine, which enables access to virtualized computer resources on the computer (e.g., memory, processors and/or the like). In effect, the virtual machine stops all operations and ceases to provide services to the end user. For example, the DLP module may communicate a freeze command to the virtual machine in order to access a portion of the memory that reflects a memory state associated with the frozen virtual machine as well as any updates to the data objects on the virtual disk (e.g., subsequent data writes).

At step 608, a snapshot for the virtual machine is created and started. In some embodiments, the DLP module calls various virtualization functions using one or more processors to generate a snapshot (e.g., the snapshot 420 of FIG. 4) of the frozen virtual machine in memory at the computer as described in detail within the present disclosure. At step 610, the virtual disk is mapped from the snapshot. In some embodiments, the DLP module calls a mapping module (e.g., the mapping module 314 of FIG. 3) to mount the virtual disk and determine locations (e.g., extents) for each and every data object. At step 612, the virtual disk and/or the snapshot are scanned. In some embodiments, the DLP module accesses the determined locations and performs an address scan of the data objects using a DLP policy (e.g., the DLP policy 320 of FIG. 3).

At step 614, sensitive information is identified within the virtual disk and/or the snapshot. In some embodiments, the DLP module, using the one or more processors, determines that one or more portions of one or more particular data objects include the sensitive information (e.g., the sensitive information 112 of FIG. 1) as defined by the DLP policy. At step 616, the virtual disk and/or the snapshot are unmounted. In some embodiments, the DLP module instructs the mapping module to unmount the virtual disk and/or the snapshot. At step 618, the snapshot is deleted. In some embodiments, the DLP module deletes the snapshot from the memory. The method 600 proceeds to step 628 at which the method 600 ends.

If, at step 604, the virtual machine is determined to not be in operation, the method 600 proceeds to step 620. At step 620, the virtual disk is mapped. The DLP module, as explained in the present disclosure, calls the mapping module to mount the virtual disk and determine the locations (e.g., extents) for each and every data object according to some embodiments. At step 622, the virtual disk is scanned. In some embodiments, the DLP module examines the virtual disk, in accordance with the DLP policy, to identify the sensitive information. At step 624, the sensitive information is identified. In some embodiments, the DLP module, using the one or more processors, determines that the one or more portions of the one or more particular data objects include the sensitive information. At step 626, the virtual disk is unmounted. In some embodiments, the DLP module instructs the mapping module to unmount the virtual disk. At step 628, the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present disclosure, other and further embodiments of the invention may be devised without departing from the basic scope thereof, and the scope thereof is determined by the claims that follow.

The invention claimed is:

1. A method for protecting sensitive information from disclosure through virtual machine files, comprising:
    halting at least one virtual machine on a host machine of at least one processor and deleting the at least one virtual machine;
    processing at least one virtual disk using the at least one processor to access data objects in memory that are associated with the at least one virtual machine;
    examining the data objects using the at least one processor in accordance with a data loss prevention policy in the memory to identify, using the at least one processor, sensitive information within at least one data object of the data objects;
    determining a degree of sensitivity of the sensitive information; and
    preventing disclosure of the sensitive information by securing, using the at least one processor, the sensitive information within the at least one virtual disk in the memory when the degree of sensitivity exceeds a threshold degree of sensitivity;
    wherein securing the sensitive information further comprises rendering the at least one virtual disk inaccessible for unauthorized use.

2. The method of claim 1, wherein processing the at least one virtual disk further comprises generating mapping information in the memory associated with the data objects and the at least one virtual disk.

3. The method of claim 2, wherein examining the data objects further comprises performing an address scan of the data objects within the at least one virtual disk using the mapping information and the at least one processor.

4. The method of claim 1, wherein the sensitive information is inaccessible after the securing step.

5. The method of claim 1, wherein securing the sensitive information further comprises performing at least one quarantining, encrypting or deleting, using the at least one processor, the at least one virtual disk comprising the at least one data object.

6. The method of claim 1, wherein processing the at least one virtual disk further comprises:
    generating at least one snapshot of the at least one virtual disk that is associated with the at least one virtual machine; and
    determining mappings, in the memory using the at least one processor, between the data objects and locations within the at least one virtual disk and the at least one snapshot.

7. An apparatus for protecting sensitive information from disclosure through virtual machine files, the apparatus comprising:
    at least one computer processor;
    at least one memory storing instructions that when executed by the at least one computer processor cause the apparatus to:
        halt at least one virtual machine on a host machine of the at least one computer processor and delete the at least one virtual machine;
        access at least one virtual disk that is associated with the at least one virtual machine to determine mappings between data objects and the at least one virtual disk using the at least one computer processor;
        examine, using the at least one computer processor, the data objects within the at least one virtual disk using the mappings;
        identify sensitive information within at least one data object based on a data loss prevention policy in the memory using the at least one computer processor;
        determine a degree of sensitivity of the sensitive information; and
        prevent disclosure of the sensitive information by rendering the at least one virtual disk that comprises the at least one data object of the at least one virtual disk inaccessible for unauthorized use using the at least one computer processor when the degree of sensitivity exceeds a threshold degree of sensitivity.

8. The apparatus of claim 7, wherein the computer processor further cause the apparatus to perform at least one of deleting, encrypting or quarantining the at least one virtual disk.

9. The apparatus of claim 7, wherein the computer processor further cause the apparatus to perform an address scan of the at least one virtual disk to detect the sensitive information.

10. A non-transitory computer-readable-storage medium comprising one or more processor-executable instructions that, when executed by at least one processor, causes the at least one processor to:
- halt at least one virtual machine on a host machine of the at least one processor and delete the at least one virtual machine;
- access mapping information associated with data objects within at least one virtual disk in memory that are associated with the at least one virtual machine using the at least one processor;
- scan the data objects using a data loss prevention policy for identifying sensitive information;
- determine a degree of sensitivity of the sensitive information; and
- prevent disclosure of the sensitive information by rendering the at least one virtual disk comprising the sensitive information associated with the at least one virtual machine inaccessible for unauthorized use when the degree of sensitivity exceeds a threshold degree of sensitivity.

11. The non-transitory computer-readable-storage medium of claim 10 further comprises one or more processor-executable instructions that, when executed by the at least one processor, causes the at least one processor to:
- perform at least one of encrypting, quarantining, or deleting the at least one virtual disk comprising sensitive information of the data objects.

12. The non-transitory computer-readable-storage medium of claim 10 further comprises one or more processor-executable instructions that, when executed by the at least one processor, causes the at least one processor to:
- map the data objects to location within the at least one virtual disk when at least one virtual machine associated with the at least one virtual disk is not operational.

13. The non-transitory computer-readable-storage medium of claim 10 further comprises one or more processor-executable instructions that, when executed by the at least one processor, causes the at least one processor to:
- create at least one snapshot of the at least one virtual disk associated with the at least one virtual machine; and
- generate mapping information associated with the data objects, the at least one snapshot, and the at least one virtual disk.

14. The non-transitory computer-readable-storage medium of claim 10 further comprises one or more processor-executable instructions that, when executed by the at least one processor, causes the at least one processor to:
- perform an address scan on the at least one virtual disk and the at least one snapshot using the mapping information; and
- identify the sensitive information within at least one data object of the data objects based on the data loss prevention policy.

* * * * *